Oct. 20, 1970     L. H. HORNBOSTEL, JR     3,534,497
MEANS FOR GERMINATING SEEDS AND REPLANTING
SEEDLINGS OR THE LIKE GROWN THEREFROM
Filed Feb. 9, 1968

INVENTOR.
LLOYD H. HORNBOSTEL Jr.
BY
ATTORNEY

United States Patent Office 3,534,497
Patented Oct. 20, 1970

3,534,497
MEANS FOR GERMINATING SEEDS AND REPLANTING SEEDLINGS OR THE LIKE GROWN THEREFROM
Lloyd H. Hornbostel, Jr., Beloit, Wis., assignor, by mesne assignments, to Keyes Fibre Company, Waterville, Maine, a corporation of Maine
Filed Feb. 9, 1968, Ser. No. 704,478
Int. Cl. A01g 9/10
U.S. Cl. 47—38                                      1 Claim

ABSTRACT OF THE DISCLOSURE

Planting units for raising and planting individual tree seedlings or the like embody planting media produced primarily from inexpensive waste products of wood and paper industries and are preferably of novel tapered configuration conducive to efficient handling and to promoting the health and survival expectancy of the seedlings.

BACKGROUND OF THE INVENTION

Field of the invention

The present invention relates to means for germinating seeds and replanting plants grown therefrom; and, more specifically, to such means which are particularly suitable for raising and replanting tree seedlings.

Description of the prior art

To facilitate the raising and replanting of tree seedlings or the like, it is well known to plant individual seeds in separate or readily separable bodies of earth or other planting media, whereby each resulting plant can be replanted along with its planting media without disturbing its root system.

The system which is probably most widely used at the present time to accomplish this objective involves raising each seedling in a planting unit comprising a quantity of planting media located within a compartment of an expendable or reusable container, from which the seedling is removed and replanted along with such media at the replanting site. This system, however, is relatively expensive due to the labor involved in carefully removing each seedling and its planting media from its respective compartment and in collecting and transporting the empty containers for reuse or disposal. Even though the containers may be expendable, this latter operation is nevertheless usually necessary to prevent discarded containers from destroying vegetation or from being ingested by wild or domestic animals inhabiting the replanting area.

Alternatively, it is also known to grow each seedling in a planting unit comprising a body of planting media retained in predetermined form prior to replanting by means of a binder material or packaging material which will gradually decompose in the earth after such replanting has been accomplished. While this system is obviously advantageous over the one previously described from the standpoint of reducing the number of operations required in the replanting operation, it has not proved entirely suitable to many applications for various reasons, including the relatively high cost of the decomposable binder or package material heretofore required.

In utilizing either of the foregoing techniques, it will be apparent that a number of different criteria are determinative of the various characteristics of the planting media per se. The most obvious of these criteria is, of course, that the media be as similar as possible to the natural earth in which a particular type of seedling is known to prosper; particularly with regard to the permeability of the media by root growth, the nutrient value of the media, its capacity to absorb and retain moisture and its permeability to the passage of air essential to proper root development. Also, if the planting units are to be self-cohesive, it is important that they retain their initial form and strength for a sufficient time to allow the seedlings to develop to the replanting stage; but decompose in the ground without inhibiting further growth of the seedlings.

It has long been recognized that comminuted wood particles such as sawdust or wood chips can be employed with a small amount of added nutrient to provide a planting media which simulates quite adequately the requisite qualities of natural soil. However, it has been assumed heretofore that the non-cohesive nature of such comminuted wood particles dictates the use of relatively expensive decomposable binder materials, such as synthetic resins, in order to provide a planting unit devoid of a separate packaging member.

In addition to the qualities of the planting media, per se, the physical size and shape of the individual units is also influential in facilitating efficient handling, husbandry and replanting of the units, as well as in promoting the health and survival expectancy of the units both before and after such replanting. Although prior art teachings disclose various sizes and shapes of the planting media body employed in different types of planting units, such configurations have been predicated primarily on considerations of packaging techniques, which are not necessarily compatible with achieving the foregoing objectives.

SUMMARY OF THE INVENTION

The present invention substantially reduces both the labor requirements and material expenses involved in growing and replanting tree seedlings or the like by providing self-cohesive planting units, such units being formed entirely of very inexpensive materials which are customarily available in regions in which large scale planting of tree seedlings is required. More particularly, in accordance with the preferred embodiment of the present invention described below, the principal materials of such units comprise wood chips or sawdust in combination with comminuted paper or paperboard clippings which serve as the binder medium; both of such materials comprising waste products of wood and paper industries which are usually proximate to forestation and reforestation regions.

In addition to providing very inexpensive planting units combining desirable physical characteristics of stability, strength, porosity, nutrition, decomposability, etc., the present invention also contemplates forming such units in novel tapered shapes adapted to simplify the handling, husbandry and replanting of the units while at the same time improving the health and survival expectancy of the seedlings both before and after such replanting.

Various means for realizing the foregoing objectives, and other features and advantages of the invention will be apparent from the following detailed explanation of an illustrative preferred embodiment thereof, reference being made to the accompanying drawings in which like reference numerals refer to like elements.

DESCRIPTION OF ILLUSTRATIVE PREFERRED EMBODIMENT

Referring first to the materials comprising the subject planting units, I have discovered that the aforementioned qualities of self-cohesive planting media can be realized very economically and without elaborate production equipment by employing a composition which in its dry condition is comprised, by weight, of 70% to 90% wood particles, 10% to 30% paper particles, less than 5% organic nutrient and less than 3% of a suitable biodegradable wetting agent.

To form the desired planting units, these components are mixed in an aqueous slurry to provide what might be described as a paper mache mixture heavily filled with wood particles and containing relatively small quantities of nutrient and wetting agent. This mixture is then introduced into a mold of the type well known in the pulp molding art, whereby the so-called white water drains through foraminous surfaces of the mold as the mold cavities are filled with the aqueous suspension of solid materials. After the mold cavities are thus filled with saturated solid material, substantially all of the remaining water absorbed by and entrained in the molded mixture is removed by a drying operation, during which the formed units are subjected to temperatures exceeding 300° F. When this drying operation is completed, the molded units are in a completely finished state and, by virtue of the drying temperature, are entirely free of potentially harmful bacteria or fungus organisms.

Although the particle size and the ratio of wood and paper constituents is not critical, my experiments have shown that very desirable results can be achieved by combining hardwood particles which are predominately of a size within the range of approximately 15 to 30 mesh with kraft paper or paperboard pulped, in a weight ratio of approximately four to one, and by forming such a mixture in foraminous mold cavities fabricated from wire screen of about 60 mesh. Likewise, while various known techniques are suitable for drying the mold bodies, I have found that this operation can be performed very effectively by forcing heated drying air directly through the molded material in a manner; whereby the drying air supplements the natural drainage of water through the mold walls to provide a somewhat compacted disposition of the molded material adjacent the external surfaces of the units defined by the foraminous mold surfaces. Also, since this drying technique causes the hot drying air to permeate the entire mass of material, complete sterilization of the unit is thereby assured.

Figure 1:
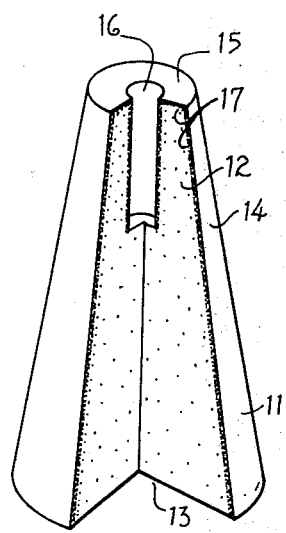
FIG. 1 is a perspective view of a preferred embodiment of the invention comprising a planting unit particularly adapted for use in raising and replanting pine tree seedlings or other seedlings having similar root characteristics, such unit being depicted partially cut away to illustrate its internal structure.

Referring now to the drawings, each planting unit 11 according to the illustrated preferred embodiment of the invention will be seen to comprise a self-cohesive mass of planting media 12 in the form of a truncated right cone defined by a generally flat or somewhat concave bottom surface 13 from which side wall surface 14 tapers upwardly to a smaller generally flat top surface 15 surrounding a central hole 16. The advantages of this configuration are not limited to planting units produced by the above-described techniques or to units comprising the preferred planting media composition, but it will be apparent that such units are well adapted to being molded by that technique in inverted position in downwardly tapered foraminous mold cavities provided with centrally located core pins which serve to form holes 16. Since this molding process inherently produces migration of water toward and through the side and top surfaces of the units, particularly if drying air is forced into the base surfaces, the previously described density gradient will develop automatically to produce a compacted layer of media adjacent surfaces 14 and 15, as depicted at 17 in FIG. 1.

To prepare the planting units for their intended use, a pine seed is dropped into hole 16 of each unit, such hole being then filled with sterilized earth 18 or with any other appropriate media, including that of the unit itself. Since the seeds will remain dormant in the units until provided with moisture, the prepared units can then be stored indefinitely as long as they are kept in a relatively dry environment.

The seedling growing process is initiated by wetting the planting media to provide the seeds with sufficient moisture to effect germination and sprouting; whereafter the media must remain moist to promote development of the growing plant. However, it is very important that the media is not actually saturated with water for prolonged periods of time, which can result in rotting of the seeds or root systems and in the development of harmful fungi or bacterial growths.

Figure 3:
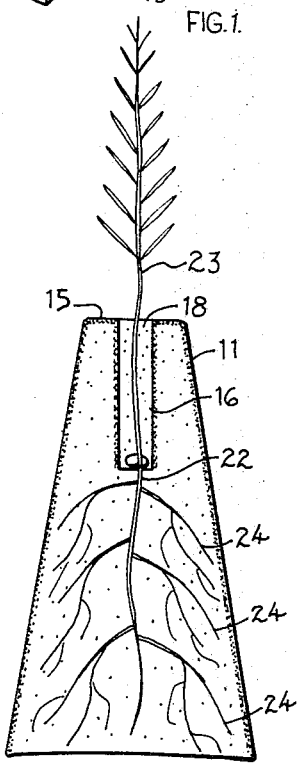
FIG. 3 is a vertical cross-sectional view through a planting unit corresponding to FIG. 1, showing the development of a pine tree seedling raised in the illustrated unit.

The required moistening of the units is most effectively accomplished by placing them upright in a tray or the like, as shown at 19 in FIG. 3, which can be flooded with water. Due to the absorbent capillary nature of the cohesive planting media, accentuated by the addition of a wetting agent, each unit will absorb an amount of water equal to at least twice its own weight, which is typically in the range of six to eight pounds per cubic foot. Accordingly, when the units have become thoroughly wet, the remaining water can be drained from the tray; which is subsequently reflooded and drained in the same manner only as often as required to prevent the media from drying out. Alternatively, or to supplement such periodic flooding, the units also may be moistened by other means such as fog spraying, or natural rainfall.

As illustrated by FIG. 3, the bottom surface 21 of the tray is only partially covered by the units, thereby promoting complete drainage of the tray and minimizing the possibility of continuous saturation of the base portions of the planting unit by water trapped below such units. The conical form of the units similarly prevents their side surfaces from being in intimate contact with one another to prevent water from being trapped between such surfaces. Also, the resulting exposure of the side surfaces of the units to air and light reduces the likelihood of fungus development on those surfaces and insures the adequate availability of essential air to the growing root systems.

Figure 2:
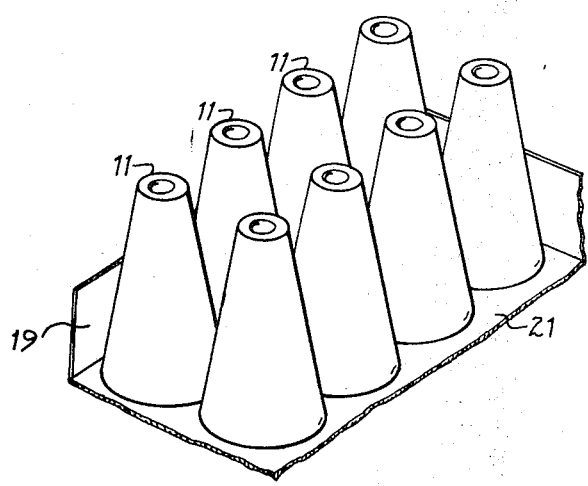
FIG. 2 is a perspective view of a plurality of planting units of the type shown in FIG. 1, such units being depicted arranged in a tray representative of a watering tray or transporting container.

As a pine tree seed sprouts, it sends down a central tap root shown at 22 in FIG. 2, directly below the upwardly growing seedling stem 23. From this central tap root, smaller lateral roots 24 grow outwardly, such lateral roots generally being of increasing length toward the bottom of the tap root. Hence, the illustrated planting units, which are proportioned specifically for use in raising pine seedlings, are tapered at an included angle of approximately twenty degrees so that the shape of the units corresponds generally to the space occupied by a typical pine seedling root system. For other types of seedlings this angle typically might be as small as about fifteen degrees to as large as about forty-five degrees. In this manner, the tapered shape of the units facilitates standing them upright in a tray without additional support means; minimizes the amount of planting media required for each unit; and simplifies the removal of the units from the tray by allowing them to be grasped easily. Furthermore, the somewhat denser nature of the media adjacent the side surfaces of the units retards penetration of the lateral roots therethrough to encourage the development of a uniformly disposed root system of corresponding shape.

The depicted pine seedling planting units preferably are approximately three to five inches in height, depending on the desired size of the seedlings at the replanting stage of their growth; i.e., when the root system of each seedling substantially fills the lower portion of the corresponding planting unit.

Ideally, the units are planted in the ground when the size of the stems indicates that the root systems substantially fill the planting media or, when the ends of the lateral roots just begin to emerge through the sides of the units. In practice, however, the planting of the units will be delayed occasionally until the lateral roots have emerged well beyond the units. Therefore, if the lateral surfaces of adjacent units were in close proximity, as in the case of cubical or cylindrical units, the roots would penetrate the adjacent units. Accordingly, separating the individual units would require careful cutting of the interstitial roots connecting those units together. The tapered structure of the illustrated units also substantially avoids this problem by confining such inter-rooting to the base portions of adjacent units, which can be pulled apart physically without inflicting serious damage to the overall root systems.

Figure 4:
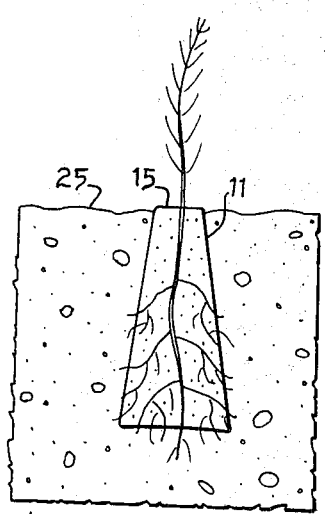
FIG. 4 is a cross-sectional view corresponding to FIG. 3 and showing the further development of the depicted seedling after the illustrated unit has been planted in the ground.

In planting the seedlings, the moist planting units are buried in the ground with the top surface 13 of each unit flush with or slightly higher than the earth surface as shown at 25 in FIG. 4. Since the holes 16 in the units are of a preselected uniform depth, the top surfaces of the units therefore provide a convenient means of insuring that the seedlings are planted at an optimum depth. Furthermore, the exposure of the top surfaces of the units after they have been planted insures sufficient evaporation to prevent the units from remaining waterlogged as the result of heavy rains or flooding before drainage is established by intimate contact of the media with the surrounding earth. However, the exposure of the top surfaces of the units is not sufficiently large to cause undue evaporation from the planting media under normal moisture conditions. It will be apparent also that the uniform size and conical shape of the subject units is ideally suited to automatic planting techniques, thereby minimizing hand labor in performing the planting operations.

As seen in FIG. 4, the conformity of the planting media to the natural disposition of the seedling roots allows all of the roots to enter the surrounding earth more or less concurrently, even though the roots may not have emerged from the media when the unit is planted. Therefore, it will be apparent that the seedling is able to derive moisture and nutrient from the earth through all of its roots much sooner than if the walls of the media were vertical and consequently still remote from the upper lateral roots.

As the seedling develops, it continues to obtain moisture and nutrient from the planting media, which also serves to insulate its central root system and to isolate it from bacteria or the like in the surrounding soil. Under usual climatic conditions, however, the planting media will have decomposed and lost its cohesive qualities by the end of the first growth season of the planted seedling, leaving behind only organic humus material.

Although the foregoing description relates to a preferred embodiment of the subject planting units adapted specifically to rearing pine tree seedlings, it should be apparent that the same basic structure can be reproportioned in accordance with characteristices of other types of seedlings while still preserving the many benefits derived from the upwardly tapered configuration common to all such variations. Similarly the same type of tapered configuration can also be employed beneficially in units comprising other planting media, either self-cohesive or packaged in decomposable tapered packaging members. Furthermore, the utility of the above-described self-cohesive planting media is not limited to planting units shaped in accordance with the present invention, inasmuch as the same media could be employed beneficially in other types of self-cohesive planting units. Since these and other variations and modifications are within the spirit and scope of the invention, the foregoing disclosure is to be considered as illustrative only and not as limiting the scope of the invention which is defined by the following claim.

I claim:

1. A planting unit comprising a self-cohesive planting media comprised of from about 70% to about 90% by weight hardwood particles which are predominantly of a size within the range of approximately 15 to 30 mesh, from about 10% to about 30% by weight paper particles, less than about 5% by weight organic nutrient, and less than about 3% by weight biodegradable wetting agent, the unit being tapered inwardly from a generally flat bottom portion to a substantially smaller flat top portion surrounding a downwardly extending seed hole, the density of the media increasing toward the tapered surface areas and decreasing toward the interior portions near the base of the seed hole.

References Cited

UNITED STATES PATENTS

| | | | |
|---|---|---|---|
| 1,446,113 | 2/1923 | Blackwell | 47—34 |
| 1,534,508 | 4/1925 | Earp-Thomas | 47—34 |
| 2,728,169 | 12/1955 | Spengler et al. | 47—37 |
| 2,757,841 | 8/1956 | Chapman | 47—37 XR |
| 3,187,463 | 6/1965 | McCollough et al. | 47—34 |

FOREIGN PATENTS

| | | |
|---|---|---|
| 143,393 | 1/1902 | Germany. |
| 1,146,302 | 3/1963 | Germany. |

ROBERT E. BAGWILL, Primary Examiner